March 8, 1938.    A. G. WILLIAMSON    2,110,719
DYNAMO-ELECTRIC MACHINE
Filed March 4, 1936
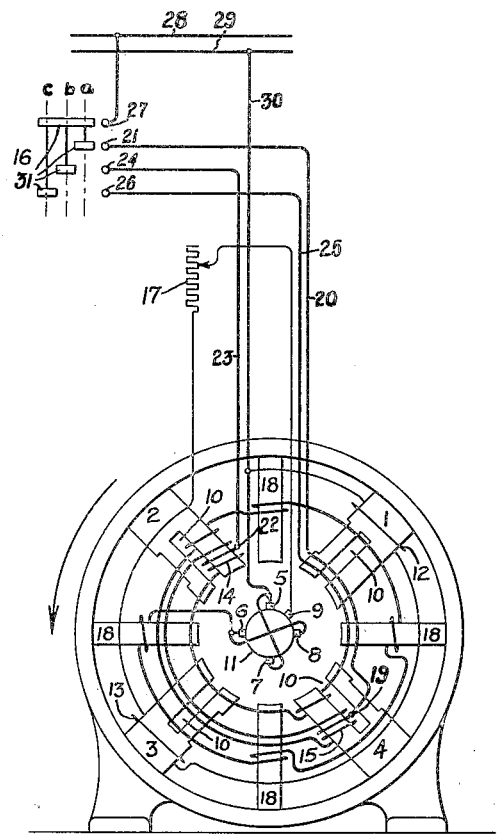
Inventor:
Alexander G. Williamson,
by Harry E. Dunham
His Attorney.

Patented Mar. 8, 1938

2,110,719

UNITED STATES PATENT OFFICE 2,110,719

DYNAMO-ELECTRIC MACHINE

Alexander Greenwood Williamson, Manchester, England, assignor to General Electric Company, a corporation of New York Application March 4, 1936, Serial No. 67,152
In Great Britain March 16, 1935

6 Claims. (Cl. 171—223)

My invention relates to dynamo-electric machines and particularly to dynamo-electric machines for generating direct-current electrical energy of the kind in which the armature current under short-circuit conditions is limited to a predetermined value and the open circuit voltage is also limited to a predetermined value. Such generators are particularly applicable for supplying energy for arc welding and are sometimes called constant current generators.

It is an object of my invention to povide a improved self-exciting direct-current generator of the constant current type having an inherent regulation suitable for maintaining a welding arc or for supplying another load of similar character.

My invention will be best understood from a consideration of the embodiment illustrated in the accompanying drawing which diagrammatically illustrates a 4-pole machine.

According to my invention the main pole pieces are each radially slotted to form leading and trailing pole portions, and the trailing pole portions are constructed and arranged to operate substantially at magnetic saturation. Shunt field windings are provided around alternate pole pieces and series field windings are disposed on the leading portion of each of the other pole pieces. The series field windings are connected so as magnetically to oppose the shunt field windings, and the shunt field windings under operating conditions are energized at constant strength from that portion of the armature winding under the trailing pole portion of one of the pole pieces. The shunt field windings inherently maintain the trailing pole portions of the pole pieces substantially magnetically saturated irrespective of or assisted by the series field windings.

The particular embodiment of my invention illustrated in the drawing is provided with four main pole pieces 1, 2, 3, and 4, four main brushes 5, 6, 7, and 8, and an auxiliary brush 9. Each of the pole pieces is provided with a slot 10 which divides the pole piece into leading and trailing pole portions, the direction of rotation being as indicated in the drawing. The main brushes and the auxiliary brush engage a commutator 11 which is connected to the armature winding (not shown) located between the pole pieces. The main brushes engage this commutator so that their lines of commutation are between adjacent pole pieces and the auxiliary brush engages this commutator so that its line of commutation is under the slot in the main pole piece 1. Shunt field windings 12 and 13 are located on two diametrically opposite pole pieces 1 and 3 and are energized under operating conditions at constant strength from that portion of the armature winding under the trailing pole portion of pole piece 1 by being connected across auxiliary brush 9 and main brush 5. The series field windings 14 and 15 are located on the leading portions of each of the other pole pieces 2 and 4 and are connected in series with the main brushes 5—7 and 6—8, which are interconnected as shown in the drawing. The series field windings are connected so as magnetically to oppose the shunt field windings. These series field windings each consist of a plurality of sections which are connected to a tapping switch 16. For example, each series winding may comprise three sections as illustrated, and the tapping switch is arranged so as to have three operative positions, the series field windings being connected to the tapping switch so that a similar number of turns on each of the leading pole portions are included in the armature circuit for any position of the tapping switch. A rheostat 17 is provided in circuit with the shunt field windings for controlling their effectiveness. Commutating pole pieces 18 located between the main pole pieces and provided with windings connected in the armature circuit may be provided as illustrated in the drawing.

The armature circuit of the machine proceeds from brushes 6—8 through the windings on the commutating pole pieces 18 and thence by way of the outer sections of the series field windings 14 and 15 to a tap 19 which is connected by a conductor 20 with a fixed contact 21 of switch 16. From tap 19 a circuit proceeds through the middle sections of series field windings 15 and 14 to a tap 22 which is connected by a conductor 23 to a fixed contact 24 of switch 16. From tap 22 a circuit proceeds by way of the inner sections of series field windings 14 and 15 and conductor 25 to a fixed contact 26 of switch 16. Switch 16 is provided with a fixed contact 27 which is connected to one side of the load circuit 28, 29, the other side of which is connected by a conductor 30 to brushes 5—7 of the machine.

The movable contacts 31 of switch 16 are electrically connected with one another and mechanically supported on a drum which has operating positions $a$, $b$, and $c$. In operating position $a$, one-third of the series field windings 14, 15 are connected in circuit; in position $b$, two-thirds of these series field windings are connected in circuit; and in position $c$, all of the series field windings are connected in circuit.

The slots in the pole pieces are preferably made relatively wide adjacent the air gap, in order to obtain good commutation at the auxiliary brush 9. The pole pieces are conveniently formed of laminated construction and the trailing pole portions, in order to provide the required magnetic saturation, may be notched or perforated over a part of their length to constrict their cross-sectional area. The yoke of the field system may be of cast or laminated construction as desired.

Instead of employing tapped series windings the adjustment of the value of the short circuit current may be obtained by means of suitable diverting resistances or other means for controlling the effectiveness of the series field windings.

Under operating conditions the shunt field windings are energized at constant strength and inherently maintain the trailing pole portions substantially magnetically saturated. The series field windings magnetically oppose the shunt field windings and assist in maintaining the magnetic saturation of the trailing portions of the pole pieces. As the armature current increases from zero, the reverse series field windings cause a reduction and eventually reverse the magnetic fluxes traversing the air gaps below the leading portions of the pole pieces and increased armature current thus causes a reduction of the resultant flux traversing the air gap, since the trailing pole portions are already saturated. Stability of operation is insured because the voltage across the shunt field windings is maintained substantially constant.

Limitation of short circuit current is obtained by the increase of the series field reversing flux with increased load current. The flux traversing the leading pole piece portions is thus progressively reduced as the armature current increases until the reverse flux from the series windings 14 and 15 counterbalances the excitation flux provided by the shunt field windings 12, 13. Thereafter, a further progressive increase of armature current produces a progressively increasing reversed flux in the leading pole piece portions which eventually will equal the flux traversing the trailing pole piece portions so that the resultant flux entering the armature is zero and no voltage is produced at the main brushes. The operation as above described depends, of course, upon the fact that the flux traversing the trailing pole piece portions is not increased correspondingly with the reduction, and eventual reversal, of the flux traversing the leading pole piece portions and this, of course, is due to the fact that the trailing pole piece portions are saturated under operating conditions. It is to be noted that if these trailing pole piece portions are not saturated at no load they are promptly saturated under load for they provide return paths for the flux set up in the leading pole piece portions by the load current. Since under operating conditions the shunt windings 12, 13 are energized at a substantially constant voltage from conductors lying under the magnetically saturated trailing pole piece portions, stability of operation of the machine is insured.

Although I have particularly described my invention in connection with a 4-pole machine, it is obvious that my invention is not limited to such construction. Furthermore, various other modifications will be evident to those skilled in the art in view of my disclosure and, accordingly, I seek to cover in the appended claims, all modifications which come within the true spirit and scope of my invention.

What I claim as new and desire to secure by Letters Patent of the United States is:

1. A dynamo-electric machine having an armature winding and pole pieces each of which is radially slotted forming leading and trailing pole portions, the trailing pole portions being constructed and arranged to operate substantially at magnetic saturation, a shunt field winding on one of said pole pieces and a series field winding on the leading portion of an adjacent pole piece, said series field winding being connected so as magnetically to oppose said shunt field winding, and said shunt field winding being energized under operating conditions at constant strength from that portion of the armature winding under the trailing pole portion of one of said pole pieces.

2. A dynamo-electric machine having an armature winding and pole pieces each of which is radially slotted forming leading and trailing pole portions, the trailing pole portions being constructed and arranged to operate substantially at magnetic saturation, shunt field windings on alternate pole pieces, and series field windings on the leading portions of each of the other pole pieces, said series field windings being connected so as magnetically to oppose said shunt field windings and said shunt field windings being energized under operating conditions at constant strength from that portion of the armature winding under the trailing pole portion of one of said pole pieces.

3. A dynamo-electric machine having an armature winding and pole pieces each of which is radially slotted forming leading and trailing pole portions, said trailing pole portions being constructed and arranged to operate substantially at magnetic saturation, shunt field windings on alternate pole pieces energized under operating conditions at constant strength from that portion of the armature winding under the trailing pole portion of one of said pole pieces, series field windings on the leading portions of each of the other pole pieces connected so as magnetically to oppose said shunt field windings, and means for controlling the effectiveness of said series field windings.

4. A dynamo-electric machine having pole pieces each of which is radially slotted forming leading and trailing pole portions, the trailing pole portions being constructed and arranged to operate substantially at magnetic saturation, shunt field windings on alternate pole pieces, series field windings on the leading portions of each of the other pole pieces, an armature winding, a commutator connected to said armature winding, main brushes engaging said commutator so that their lines of commutation are between adjacent pole pieces, and an auxiliary brush engaging said commutator so that its line of commutation is under one of the slots provided in said pole pieces, said series windings being connected in circuit with said main brushes so as magnetically to oppose said shunt field windings, and said shunt field windings being connected between one of said main brushes and said auxiliary brush.

5. A dynamo-electric machine having pole pieces each of which is radially slotted forming leading and trailing pole portions, the trailing pole portions being constructed and arranged to operate substantially at magnetic saturation, shunt field windings on alternate pole pieces, series field windings on the leading portions of each of the other pole pieces, an armature winding, a commutator connected to said armature winding, main brushes engaging said commutator so that their lines of commutation are between adjacent pole pieces, and an auxiliary brush engaging said commutator so that its line of commutation is under one of the slots provided in said pole pieces, said series field windings being connected in circuit with said main brushes so as magnetically to oppose said shunt field windings, said shunt field windings being connected between one of said main brushes and said auxiliary brush, and said slots being relatively wide adjacent the armature winding to obtain good commutation at said auxiliary brush.

6. A dynamo-electric machine having pole pieces each of which is radially slotted forming leading and trailing pole portions, the trailing pole portions being constructed and arranged to operate substantially at magnetic saturation, shunt field windings on alternate pole pieces, means for controlling the effectiveness of said shunt field windings, series field windings on the leading portions of each of the other pole pieces, means for controlling the effectiveness of said series field windings, an armature winding, a commutator connected to said armature winding, main brushes engaging said commutator so that their lines of commutation are between adjacent pole pieces, and an auxiliary brush engaging said commutator so that its line of commutation is under one of the slots provided in said pole pieces, said series field windings being connected in circuit with said main brushes so as magnetically to oppose said shunt field windings, said shunt field windings being connected between one of said main brushes and said auxiliary brush, and said slots being relatively wide adjacent the armature winding to obtain good commutation at said auxiliary brush.

ALEXANDER GREENWOOD WILLIAMSON.